Dec. 16, 1958    H. M. EATON, JR    2,864,936
METHOD OF WELDING STUD ASSEMBLY
Original Filed Jan. 29, 1954
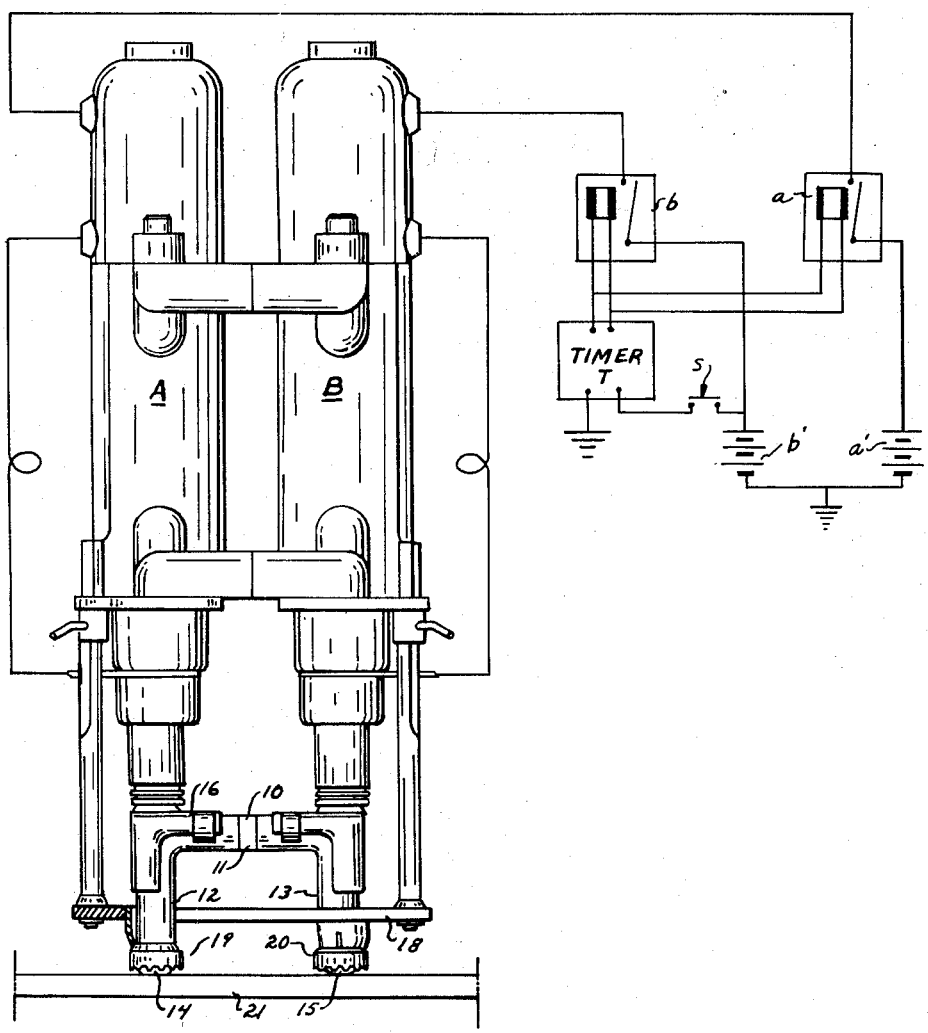
INVENTOR.
Hugh M Eaton Jr.
BY
Clyde H Haynes
his atty.

United States Patent Office 2,864,936
Patented Dec. 16, 1958

2,864,936

METHOD OF WELDING STUD ASSEMBLY

Hugh M. Eaton, Jr., Elyria, Ohio, assignor to Gregory Industries, Inc.

Original application January 29, 1954, Serial No. 407,118, now Patent No. 2,788,434, dated April 9, 1957. Divided and this application July 9, 1956, Serial No. 596,704

2 Claims. (Cl. 219—99)

The present invention relates to the method of welding stud assemblies and in particular to those having two or more weldable members which are to be end arc welded to a common work piece.

This application is a divisional application of copending application Serial No. 407,118, filed January 29, 1954, now Patent No. 2,788,434, by the same inventor.

Studs and stud welding guns for welding one member at a time to a workpiece have been on the market for some time. However, the basic problem arose in trying to end arc weld two or more metal members which were connected together. A simple example is the common U-bolt, wherein attempts have been made to end arc weld both ends of the U-bolt to a common workpiece. The difficulty arose in trying to establish identical arcs at the opposite ends of the U-bolt since welding current takes the path of least resistance. It was found that many times one of the arcs would be larger than the other arc or that one of the arcs would completely fail, thus providing a weld at only one end of the U-bolt.

This problem has been solved by designing the present stud assembly in which the members or opposite ends of the U-shaped stud assembly to be welded to the workpiece are mechanically fastened together by a body and electrically insulated from each other. A welding apparatus including a stud welding gun is used to connect each member to its respective source of welding current to weld the members to the workpiece. A welding current control for each member is connected between its respective member and source of welding current. However, the current controls are interlocked so that they operate simultaneously, thus all of the members of the stud assembly are simultaneously welded to the workpiece.

An object of the invention is to provide a method of end arc welding several studs or weldable members simultaneously to a workpiece where the studs are fastened together by an electrical insulation material, or the like.

Other objects and a further understanding of the invention will become apparent from the following description and claims when taken in conjunction with the attached drawing which illustrates stud welding apparatus used in welding the stud assembly to a workpiece.

A stud welding apparatus is illustrated as holding a stud assembly in position just prior to welding a stud assembly to the workpiece. The stud welding apparatus in this instance comprises guns A and B which are similar to the stud welding gun illustrated in Patent No. 2,413,189, issued to Ted Nelson on December 24, 1946. Gun A is electrically connected through contactor $a$ to a source of welding current $a'$ and gun B is electrically connected through a contactor $b$ to a source of welding current $b'$. The guns A and B are mechanically fastened together into an assembled unit and are operated simultaneously by closing and opening the contactors $a$ and $b$ simultaneously. These contactors $a$ and $b$ which control the welding current for their respectivce guns are simultaneously operated by a common timer T which is connected through a trigger switch S to one of the sources of welding current.

In the drawings the stud welding guns A and B are illustrated as holding the U-shaped stud assembly 10, which comprises a body of electrical insulation 11 and weldable metal members 12 and 13 carried by the insulation body 11 at a spaced distance from each other. It is understood that although this particular stud assembly is illustrated any of the stud assemblies illustrated in the co-pending divisional application may be welded similarly to a workpiece.

Again referring to Figure 1 gun A has a chuck 16 for engaging and electrically conducting welding current to member 12 and gun B has a chuck 16 to engage and conduct welding current to member 13. A foot assembly 18 secured to the guns A and B holds welding ferrules 19 and 20 at the respective welding ends of the members 12 and 13 of stud assembly 10.

After the stud assembly 10 has been inserted in the chucks of guns A and B and the ferrules inserted in the foot assembly 18, the welding ends and the ferrules are pressed against the workpiece 21. With the stud welding apparatus and the stud assembly now in welding position, the operator closes the trigger switch S to start the timer. The timer simultaneously closes contactors $a$ and $b$ causing at least one of the guns A and B to lift the stud assembly 10 and the individual welding ends 14 and 15 thereof away from workpiece 21 to strike an arc between the welding end of each metal member and the workpiece 21. The timer T keeps the contactors $a$ and $b$ closed until the arcs have sufficiently melted their respective welding ends. At the end of this time the timer T allows the contactors $a$ and $b$ to simultaneously open, thus allowing the guns A and B to simultaneously plunge the stud assembly 10 towards the workpiece to cause the individual metal members thereof to be welded to the workpiece 21.

Each of the metal members in the stud assembly is connected through its respective contactor to its respective source of welding current. Although the drawing illustrates the use of more than one welding gun for simultaneously welding the metal members, it is possible to weld the metal members simultaneously with one welding gun. In such cases the single welding gun must carry a chuck which engages one of the metal members of the stud assembly. The other metal members may then be connected directly to their respective contactors by any suitable electrical connection means. The one welding gun lifts the stud assembly from the workpiece to strike the arcs between all of the metal members and the workpiece.

The drawing represents a stud assembly having two welding ends which are simultaneously end arc welded to a common workpiece. It is understood that more weldable members may be connected together by a body which electrically isolates the studs without departing from the spirit or scope of the invention. However, each time a weldable member is added to the stud assembly, another power source and contactor must be added for that member. The common timer for all of the connectors, whether there are two or more, will operate the contactors and the gun or guns to simultaneously end weld all of the metal members or studs of the stud assembly to the workpiece 21.

Although preferred designs of the invention have been described, it is understood that the meaning of the terms and the embodiments of the invention cover slight modifications which may be made without departing from the spirit and scope of the invention, as defined in the following claims.

I claim:

1. The method of welding an assembly having at least two welding ends electrically isolated from each other and mechanically joined together, said method comprising the steps of initiating flow of several welding currents, one for each welding end simultaneously through all of the welding ends and a workpiece to which the ends are to be welded with each current flowing independently of any other current, lifting all of the welding ends simultaneously from the workpiece to draw arcs between the welding ends and the workpiece, and after a definite duration of said arcs simultaneously breaking the flow of all of said welding currents through all of the welding ends and plunging all of the welding ends simultaneously towards the workpiece to secure the assembly to the workpiece.

2. The method of simultaneously welding a plurality of studs to a plate wherein each of the studs has a welding end, said method comprising the steps of initiating flow of several welding currents, one for each welding end simultaneously through all of the welding ends and a workpiece to which the ends are to be welded with each current flowing independently of any other current, lifting all of the welding ends simultaneously from the workpiece to draw arcs between the welding ends and the workpiece, and after a definite duration of said arcs simultaneously breaking the flow of all of said welding current through all of the welding ends and plunging all of the welding ends simultaneously towards the workpiece.

References Cited in the file of this patent

UNITED STATES PATENTS

| | | |
|---|---|---|
| 1,968,079 | Hoffer | July 31, 1934 |
| 2,154,654 | Armentrout et al. | Apr. 18, 1939 |
| 2,413,189 | Nelson | Dec. 24, 1946 |
| 2,416,204 | Nelson | Feb. 18, 1947 |
| 2,670,424 | Martin | Feb. 23, 1954 |